(No Model.)

S. H. PATTERSON.
BICYCLE LOCK.

No. 557,223. Patented Mar. 31, 1896.

WITNESSES:
John Buckler,
L. M. Muller.

INVENTOR
Samuel H. Patterson,
BY
Edgar Tate & Co.
ATTORNEYS.

UNITED STATES PATENT OFFICE.

SAMUEL H. PATTERSON, OF NEW YORK, N. Y.

BICYCLE-LOCK.

SPECIFICATION forming part of Letters Patent No. 557,223, dated March 31, 1896.

Application filed August 28, 1895. Serial No. 560,748. (No model.)

*To all whom it may concern:*

Be it known that I, SAMUEL H. PATTERSON, a citizen of the United States, and a resident of New York, in the county of New York and State of New York, have invented certain new and useful Improvements in Bicycle-Locks, of which the following is a specification, reference being had to the accompanying drawings, forming a part thereof, in which similar letters of reference indicate corresponding parts.

This invention relates to locks for bicycle-wheels, and the object thereof is to produce a padlock or lock of similar character which may be applied to the sprocket-wheel of a bicycle and to the drive-chain thereon whenever it is desired to lock the machine.

The invention is fully disclosed in the following specification, of which the accompanying drawings form a part, in which—

Figure 1:
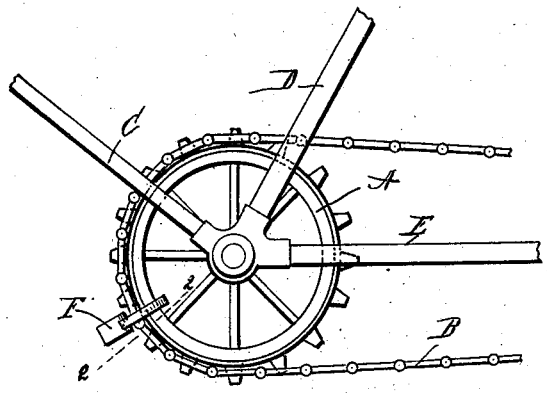
Figure 2:
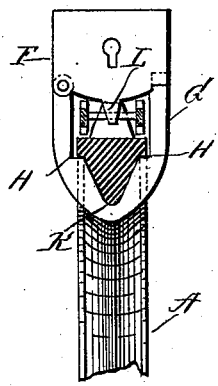

Figure 1 is a side elevation of a sprocket-wheel and its supports, showing also the drive-chain and my improved padlock applied thereto; and Fig. 2, a section on the line 2 2 of Fig. 1.

Referring to Fig. 1 of the drawings, A designates the sprocket-wheel of a bicycle, on which is mounted the drive-chain B and that portion of the frame of the bicycle which supports the sprocket-wheel, as shown at C, D, and E.

In the practice of my invention I provide a lock of the general form and character of an ordinary padlock, as shown at F, the yoke or bail G of which, however, is formed so as to conform to the shape of the rim of the sprocket-wheel in cross-section, as shown at H and K in Fig. 2, and the body of the lock is provided with a lug or extension L, which projects inward, as also shown in said figure, and when the lock is applied to the sprocket-wheel, as shown, the lug or projection L extends into the chain B or between the links thereof, as shown in Fig. 2, so as to prevent the revolution of the chain upon the wheel, and it will thus be seen that when thus applied my improved lock constitutes a simple and effective device for accomplishing the object for which it is intended.

My improved lock for bicycles is not limited to any particular form or construction of the locking mechanism, the only object being to produce a padlock of such form and construction that when applied to the sprocket-wheel and the drive-chain of a bicycle the parts will be so locked together as to prevent the operation of the machine.

Having fully described my invention, I claim and desire to secure by Letters Patent—

A lock for bicycles, consisting of a padlock, the yoke or bail of which is adapted to be connected with the rim of the wheel, and the chain, so as to inclose the same and prevent the operation of the chain on the wheel, said lock being provided with a lug or projection which extends into or between the links of the chain, substantially as shown and described.

In testimony that I claim the foregoing as my invention I have signed my name, in presence of two witnesses, this 13th day of July, 1895.

SAMUEL H. PATTERSON.

Witnesses:
L. M. MULLER,
M. A. KNOWLES.